(12) United States Patent
Domenicucci et al.

(10) Patent No.: US 8,151,977 B2
(45) Date of Patent: Apr. 10, 2012

(54) CONVEYOR FOR BAKERY OVEN

(75) Inventors: Philip J. Domenicucci, Rockaway, NJ (US); Daniel Ferland, Quebec (CA); Gaston Ouellet, Quebec (CA); Nicolas Nadeau, Quebec (CA)

(73) Assignee: AMF automation Technologies, LLC, Richmond, VA (US)

( * ) Notice: Subject to any disclaimer, the term of this patent is extended or adjusted under 35 U.S.C. 154(b) by 125 days.

(21) Appl. No.: 12/868,820

(22) Filed: Aug. 26, 2010

(65) Prior Publication Data

US 2012/0048688 A1    Mar. 1, 2012

(51) Int. Cl.
*B65G 15/60* (2006.01)

(52) U.S. Cl. ............................ 198/840; 198/852; 99/478

(58) Field of Classification Search .................. 198/837, 198/838, 840, 841, 850, 852, 853; 99/477, 99/478, 479; 184/15.1, 15.3
See application file for complete search history.

(56) References Cited

U.S. PATENT DOCUMENTS

| | | | |
|---|---|---|---|
| 3,308,768 A | 3/1967 | Orwin | |
| 3,662,873 A | 5/1972 | Ross | |
| 3,964,800 A * | 6/1976 | Grimes et al. | 198/841 |
| 4,294,345 A | 10/1981 | Stauber et al. | |
| 4,422,544 A | 12/1983 | Alldredge | |
| 4,793,473 A | 12/1988 | Gilgore et al. | |
| 4,882,981 A * | 11/1989 | Bacigalupe et al. | 99/479 |
| 5,147,033 A | 9/1992 | Kasik | |
| 5,579,897 A | 12/1996 | Kasik | |
| 5,746,305 A * | 5/1998 | Wilkins et al. | 198/838 |
| 5,779,027 A * | 7/1998 | Ensch et al. | 198/841 |
| 6,257,397 B1 | 7/2001 | Kilby et al. | |
| 6,591,968 B2 | 7/2003 | Snell et al. | |
| 6,968,943 B2 | 11/2005 | Kilby et al. | |
| 7,086,525 B2 | 8/2006 | Kilby et al. | |
| 2005/0189202 A1* | 9/2005 | Kawasaki | 198/840 |

* cited by examiner

*Primary Examiner* — James R Bidwell
(74) *Attorney, Agent, or Firm* — Thomas, Kayden, Horstemeyer & Risley, LLP

(57) ABSTRACT

An endless conveyor chain assembly (10) includes two piece enclosed curved track sections (15) having curved sections (15) for the passage therethrough of a series of conveyor chain links (12). Outer race (18) of the curved track sections (15) include an impervious horizontal bottom wall (22) that is U-shaped in cross section for retaining any lubricants or other liquids or debris. Inner race (20) with a wear strip (44) attached thereto is removable from the outer race (18) without having to cut the curved conveyor track sections (15) from the track and without having to remove the conveyor chain from the track when performing maintenance to the conveyor chain assembly.

20 Claims, 5 Drawing Sheets

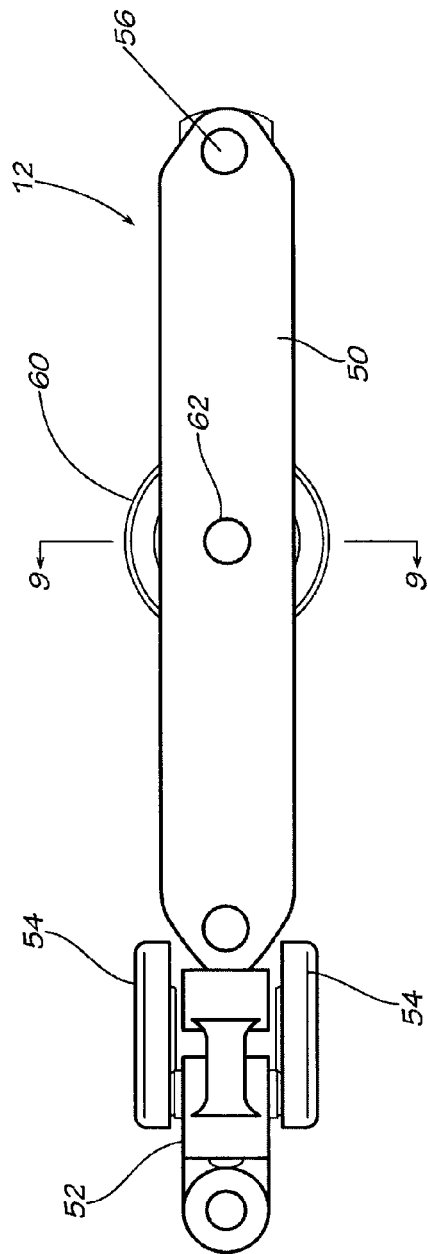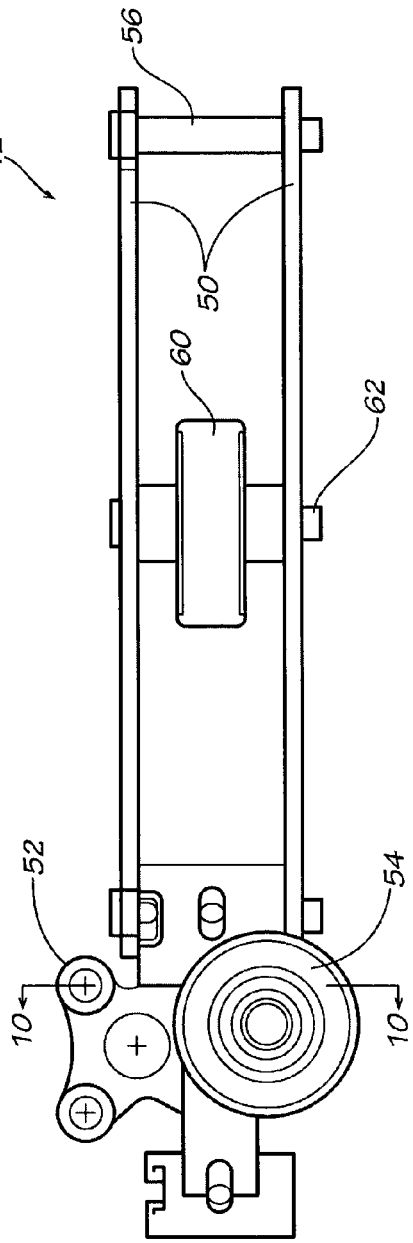
FIG. 6
FIG. 7

CONVEYOR FOR BAKERY OVEN

TECHNICAL FIELD

This disclosure generally concerns a conveyor for a bakery oven of the type that proofs and bakes bread products in a continuous process in which pans of dough are moved progressively through an open ended tunnel oven. More specifically, this disclosure concerns a conveyor chain assembly that includes a closed track with a conveyor chain that moves through the track, with the track including curved sections that may be more easily disassembled, maintained and replaced.

BACKGROUND OF THE DISCLOSURE

Continuously operated open ended ovens have been developed for proofing, cooking and otherwise treating work products such as various bread products, whereby the food products are placed on pans or on other support means and are progressively moved into, along, and out of an oven. A continuous conveyor system is used to transport the food products and the typical conveyor includes a continuous chain track formed of a series of track sections, with a continuous chain moving through the track. The track typically has impervious bottom wall and impervious opposed side walls and an open ended longitudinal continuous slot along its top wall. The chain rides on the bottom wall and the links of the chain include a pin that extends upwardly through the longitudinal continuous slot of the track for connection to bakery pans or other food support means that travel through the oven.

The baking industry prefers the one piece track sections formed with the upwardly facing longitudinal slot for the passage of the conveyor chain for simplicity of track design as well as for avoiding the escape of lubricating oils and compounds and debris from the track. Inasmuch as the conveyors for ovens are continuous and must go around curves, the track for the conveyor chain has track sections that are curved. However, the curved track sections tend to wear more rapidly than the straight track sections since the links of the chain tend to bear against the inside radius of the curved track sections and the wear on the inside radius is increased. Accordingly, the curved track sections usually must be replaced more frequently than the straight track sections.

A problem with the maintenance, repair and/or replacement of the worn curved track sections of most endless conveyor tracks is that the curved track sections are made of one piece. Generally, this requires the repair person to cut the worn curved track sections away from the straight track sections and replace the curved track sections. The cutting of a conveyor track of an oven is undesirable in that the cutting action on the materials of the conveyor track requires cutting and burning portions of the track sections, and this causes debris such as particles of metal, rust and general debris to be generated in the oven and, in some cases, the lubrication oil typically inside the track is allowed to fall inside the tunnel of the oven. This requires careful cleanup by the maintenance personnel of the oven, including cleaning the surfaces of the oven as well as the tracks and links of the chain conveyor.

Another problem with cutting away curved track sections of a continuous conveyor is that the conveyor chain must be removed from the curved track sections before replacement can be performed on the track. After the sections of the track have been repaired and replaced, then the conveyor chain must be threaded back through the track sections. Again, this requires additional labor and delay in operation of the oven.

Therefore, it would be desirable to have conveyor chain assemblies that are used with open ended ovens that have curved track sections that can be repaired and maintained without having to remove the conveyor chain from the conveyor tracks. It also would be desirable to provide a curved track section of a closed track assembly that can be opened in place without the entire removal of the track section from the oven for the purpose of maintenance, repair and replacement without significant hazard of having lubricating matter and debris escape from the track.

It is to these and other benefits and features that are described herein.

SUMMARY OF THE DISCLOSURE

Briefly, this disclosure concerns improved conveyor chain assemblies that are adapted for use in open ended ovens for baking breads and other edible products.

A continuous conveyor chain assembly is provided that includes an enclosed track including curved segments and a conveyor chain in the track. The curved segments may include an inner race and an outer race forming between them an internal chain passage and an upwardly facing longitudinal slot for passage of a portion of the conveyor chain. The inner race and the outer race may form a vertically oriented arcuate bearing wall at the inner radius of the track and a wear strip is mounted to the bearing wall for engagement by the conveyor chain. A connector holds the inner race and the outer race together such that the inner race is removable from the outer race for removing the wear strip from the curved segment of the track, leaving the outer race in place.

A conveyor chain runs through the conveyor track and includes a series of links that each include a horizontal centering wheel for engaging the wear strip of the conveyor track.

The inner race and the outer race may include coextensive inner support walls that together form the bearing wall. Preferably, the wear strip is slot welded to the inner race and is not connected to the outer race.

The disclosure concerns a conveyor chain assembly that includes a conveyor chain with links each including a horizontal centering wheel, and at least one curved track segment that includes an inner race and an outer race that may be engaged by the centering wheel for guiding the conveyor chain. A wear strip is mounted to the inner race and the wear strip is telescopically mounted in the outer race such that the inner race and the wear strip are movable vertically into assembly with the outer race and the wear strip is shaped so as to be engaged by the horizontal wheel.

The wear strip defines a path adjacent the inner race of the curved conveyor track that is to be engaged by the horizontal wheel of the chain links.

BRIEF DESCRIPTION OF THE DRAWINGS

FIG. 6 is a plan view of a link of a conveyor chain that is to be used with the conveyor track of FIGS. 1-5.

FIG. 7 is a side view of a conveyor chain link of FIG. 6.

DETAILED DESCRIPTION

Figure 1:
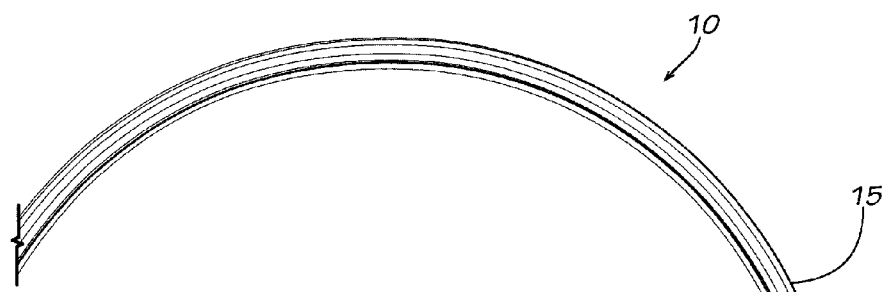
FIG. 1 is a plan view of a curved track of a conveyor chain assembly showing one link of the conveyor chain at an end of the track.

Referring now in more detail to the drawings in which like numerals indicate like parts throughout the several views, FIG. 1 illustrates a plan view of a curved track section 15 of an endless conveyor 10. The endless conveyor is to be made up of straight and curved track sections so as to extend through an open ended oven (not shown) used for carrying food products such as bread through the open ended oven.

Figure 2:
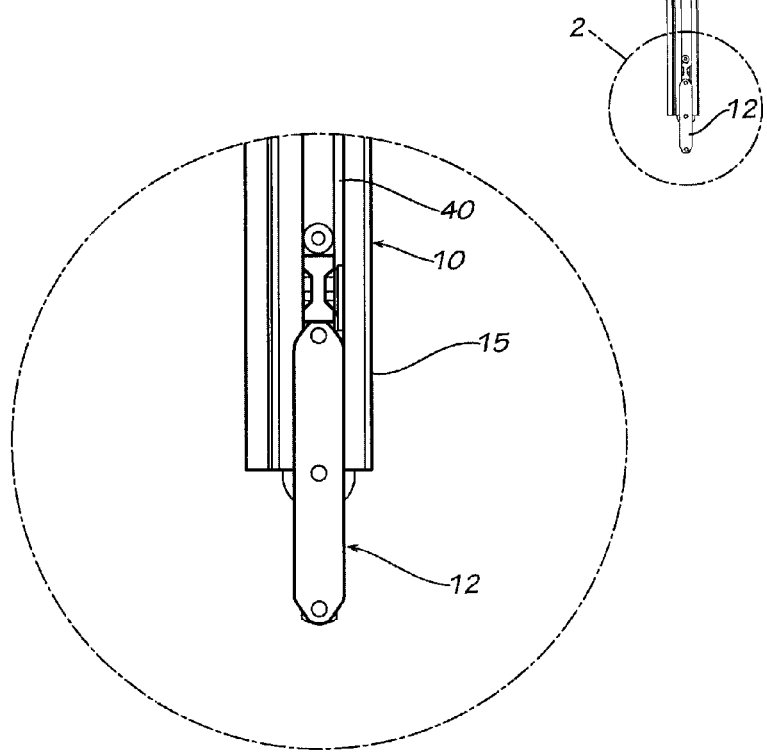
FIG. 2 is a plan view of one link of the conveyor chain and an end portion of a track segment, illustrating a portion of FIG. 1 that is designated by a circle.

As shown in FIG. 2, a series of chain links, such as chain link 12, are connected end-to-end and extend through the conveyor track. The chain links are shown in more detail in FIGS. 6-10.

Figure 3:
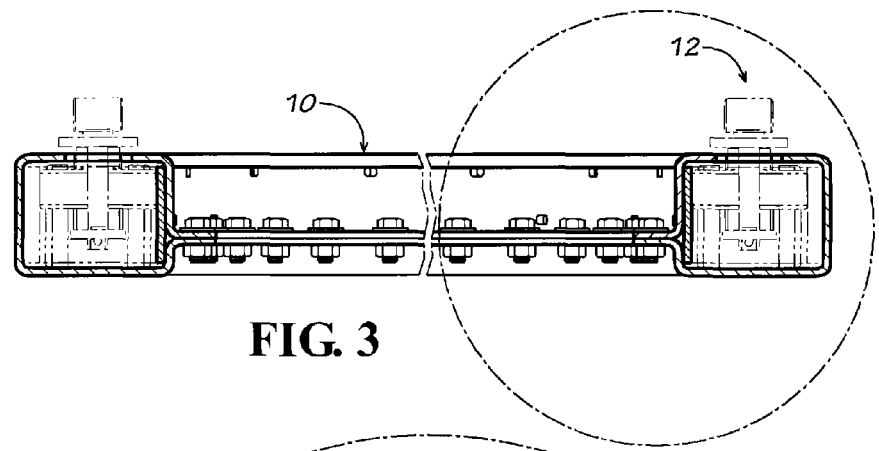
FIG. 3 is a side view of the curved track section of FIG. 1.
Figure 4:
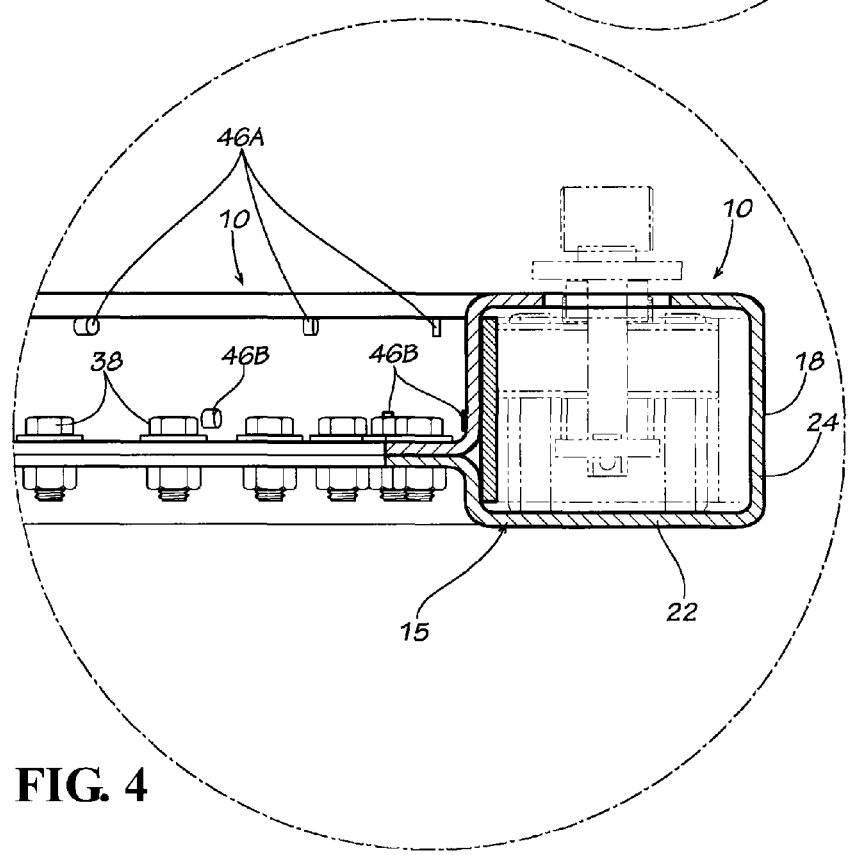
FIG. 4 is an end view of the track section of FIG. 3 showing the portion of the track section that is surrounded by a circle in FIG. 3.

FIG. 4 shows an end cut of a curved track section 15 of the endless conveyor assembly 10, indicated by the circle at the end of FIG. 3.

Figure 5:
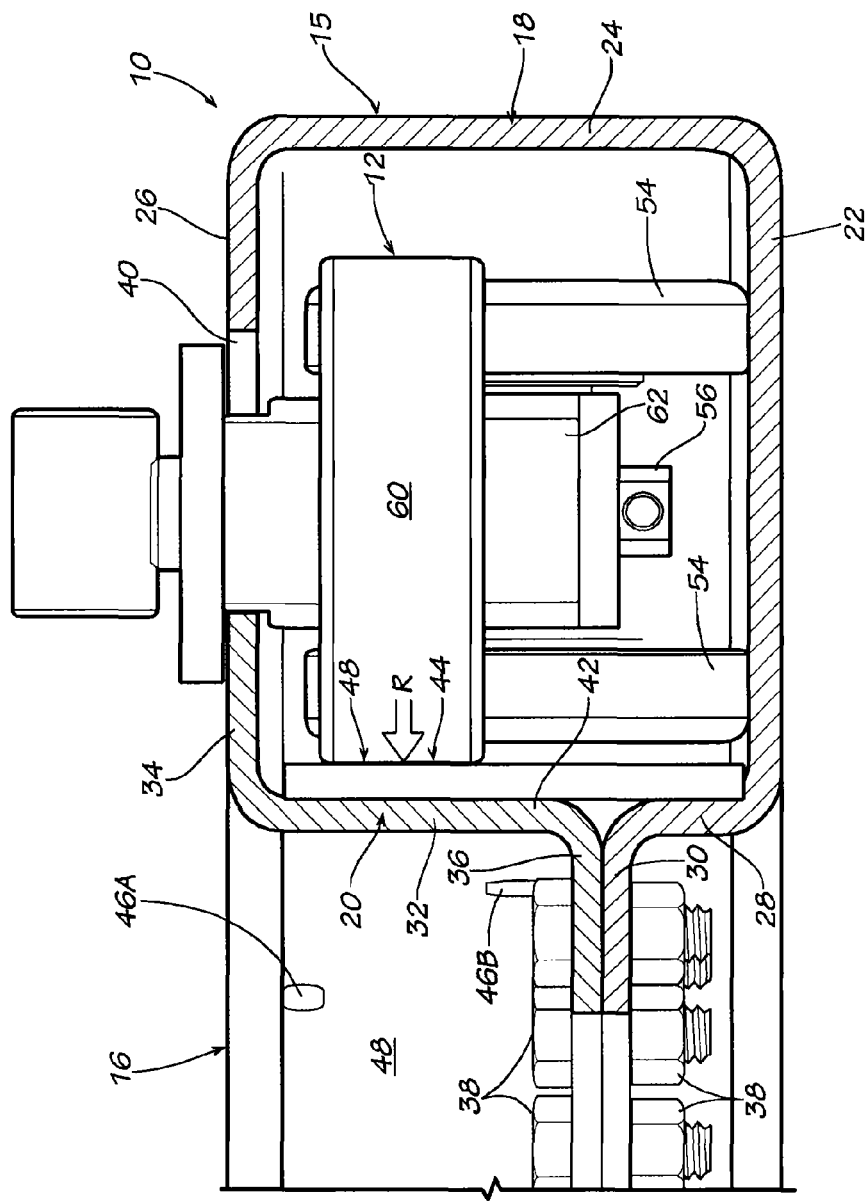
FIG. 5 is an enlarged view of the cross section of the conveyor chain assembly showing a portion of FIG. 4.
Figure 8:
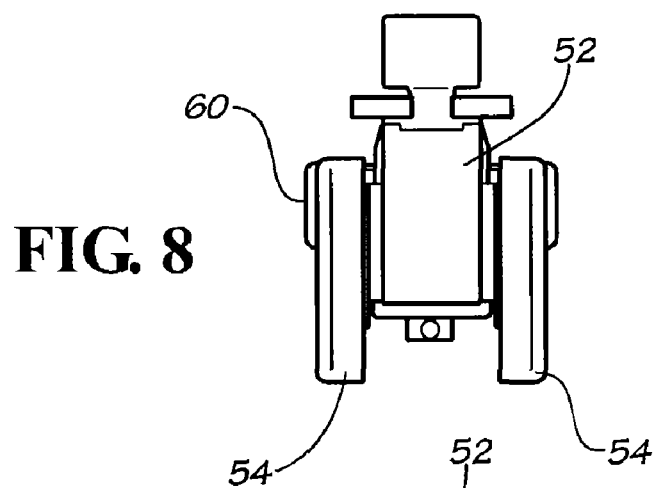
FIG. 8 is an end view of the conveyor chain link of FIG. 7.
Figure 9:
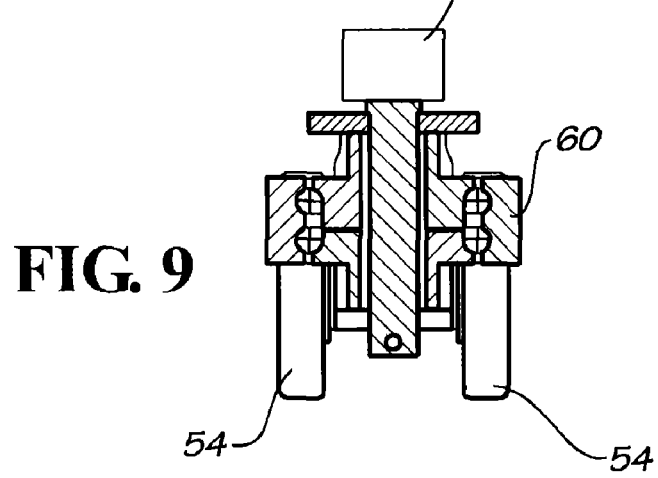
FIG. 9 is a cross sectional view of the wheel assembly of the conveyor chain link of FIG. 7, taken along lines 9-9 of FIG. 7.
Figure 10:
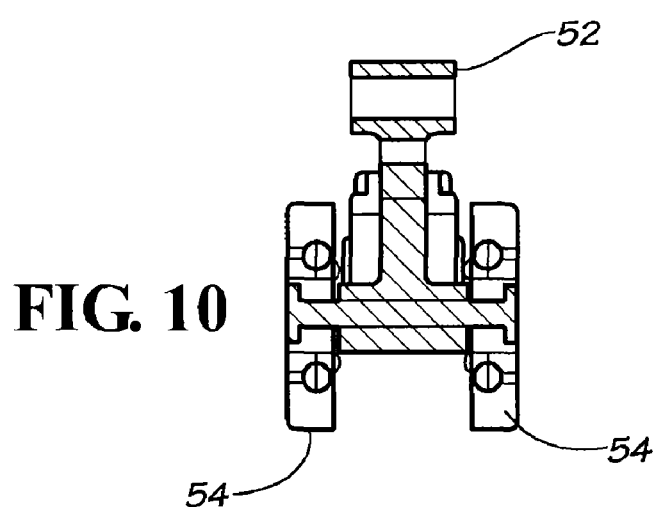
FIG. 10 is a cross sectional view of the vertical wheel assembly of FIG. 7, taken along lines 10-10 of FIG. 7.

FIG. 5 shows in more detail a cross section of the curved track section 15 of the endless chain assembly 10. The curved conveyor track section 15 is substantially rectangular in cross section and includes an outer race 18 at the outer radius of the curve of the track section and an inner race 20 at the inner radius of the curved track section. The outer race includes impervious horizontal bottom wall 22, impervious upright outer wall 24, horizontal upper wall 26, and impervious upright inner wall 28. Lower flange 30 extends radially inwardly from the upper edge of upright inner wall 28. Bottom wall 22, inner wall 28, and the lower portion of outer wall 24 form a U-shape in cross section.

Inner race 20 includes upright inner wall 32 and horizontal upper wall 34. Upper horizontal flange 36 extends radially inwardly from the lower portion of vertical inner wall 32 and is positioned in overlying relationship with respect to lower horizontal flange 30 of outer race 18. Bolts or other connectors 38 extend through and connect together the lower and upper horizontal flanges 30 and 36, connecting together the inner race 20 with the outer race 18.

The horizontal upper wall 26 of outer race 18 and the horizontal upper wall 34 of the inner race 20 are coextensive and form an open ended longitudinal slot 40.

The upright inner wall 28 of the outer race 18 and the upright inner wall 32 of the inner race 20 are coextensive and together form a force bearing wall 42.

Curved wear strip 44 is positioned in the confines of the conveyor track 16 and may be in abutment with the inside surface of the force bearing wall 42, engaging the inside surfaces of upright inner walls 28 and 32.

As shown in FIGS. 5-10, the continuous conveyor chain includes a series of chain links 12 that are connected to one another and extend interiorly along the length of conveyor track 16. As shown in FIGS. 6 and 7, the chain links 12 each include parallel links 50 connected at their ends to carriages 52. Vertical support wheels 54 are mounted to and on opposite sides of the carriages and support the chain links on the impervious horizontal bottom wall 22 of segments of the conveyor track. Vertical connector pins 56 connect the carriages 52 to the parallel links 50. Horizontal centering wheel 60 is mounted on vertical axle 62, with the horizontal centering wheel 60 positioned between and extending outwardly from the parallel links 50, with its axle 62 supported by the parallel links.

As shown in FIG. 5, wear strip 44 is arcuate shaped and its inside radius conforms to the inner radius of the coextensive vertical inner wall 28 of outer race 18 and the vertical inner wall 32 of the inner race 20. The wear strip 44 may be slot welded at intervals along its length to vertical inner wall 32, at 46A along the upper edge of the wear strip, and at 46B along the adjacent the lower portion of vertical inner wall 32. The slot weldments 46A may be displaced from the slot weldments 46B, leaving therebetween a predetermined path 48 that is aligned with the movement of horizontal centering wheel 60 of each chain link as each chain link moves through a curved section of the conveyor track 15.

Since the slot weldments 46A and 46B may connect the wear strip 44 to the vertical inner wall 32 of the inner race 20, the inner race and the wear strip become an integrated piece of the segment of the curved conveyor track. Further, the wear strip 44 extends downwardly beyond the inner race 20, down into the outer race 28 so that it may approach or abut the surface of vertical inner wall 28.

When tension is applied to the conveyor chain links 12 that extend through a curved portion of the conveyor track, radial force R is applied by the horizontal centering wheel 60 of the chain links of the conveyor chain against the facing surface of the wear strip 44 so that forces R may be transmitted from the wear strip 44 to the facing surfaces of the vertical inner wall 28 of the outer race 18 and the vertical inner wall 32 of the inner race 20.

As shown in FIG. 5, the wear strip 44 extends over the intersection of the lower horizontal flange 30 of the outer race 18 and the upper horizontal flange 36 of the inner race 20. This arrangement tends to seal the interior of the conveyor track from leakage of oil or any other liquids or debris from inside the conveyor track through the connected lower and upper horizontal flanges 30 and 36.

It will be noted that the outer race 18 is U-shaped in cross section at its impervious horizontal bottom wall 22, making a reservoir for any lubricating oil or other liquids or debris that might be present in the interior of the conveyor track. This tends to assure that no foreign matter will be expelled from the conveyor track 16 into the oven during normal operation of the oven and conveyor chain assembly.

When wear is detected in the curved track sections of the conveyor track 16, the inner race 20 may be disconnected from the outer race 18 by removing the connectors 38 that are used to lock together the outer and inner races 18 and 20 of the conveyor track. The inner race 20 and wear strip may then be lifted with respect to the outer race 18 until the bottom edge of the wear strip 44 clears the vertical inner wall 28 of the outer race 18, so that the inner race and wear strip may be removed from the outer race. This exposes the interior of the outer race 18 and allows the inner race 20 and its wear strip 44 to be replaced with a substitute inner race and wear strip. This may be accomplished without having to remove either the conveyor chain or the outer race 18. In the meantime, any pool of liquid that might be present in the outer race 18 is contained by the U-shape shape of the impervious horizontal bottom wall 22 and the upwardly extending vertical outer wall 24 and vertical inner wall 28. Also, no grinding, burning or cutting of material is likely to be required during the removal of the inner race 20 and its wear strip 44.

When a substitute inner race 20 and wear strip 44 are to be connected to the outer race 18, the substitute inner race will be moved radially outwardly until the wear strip 44 is aligned inside the vertical inner wall 28 of the outer race 18. Then the assembled inner race and wear strip are moved downwardly, with the wear strip 44 moving telescopically inside the vertical inner wall 28 until the upper horizontal flange 36 of the inner race engages the lower horizontal flange 30 of the outer race so that the connectors 38 may be used to rigidly connect these elements together.

The convenience of the removable inner race 20 and the wear strip 44 allows the maintenance, repair and replacement of the curved track sections to occur without having to cut, burn or grind the conveyor track sections 15 for removing the curved track sections from the assembled conveyor track. Also, the chain links 12 of the conveyor chain do not have to be removed from the still partially assembled endless conveyor track.

While the conveyor chain assembly has been described for use in bakery ovens, other uses in different technologies may be appropriate. Further, the particular configuration of the chain links as herein disclosed may be varied, and the configuration of the conveyor track is adaptable for used with other known endless chains.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. A conveyor chain assembly comprising:
   an enclosed conveyor track including a curved segment for the passage there through of a conveyor chain,
   said curved segment including an inner race and an outer race forming there between an internal chain passage and an upwardly facing longitudinal slot for passage of a portion of said conveyor chain,
   said inner race and said outer race forming a vertically oriented arcuate bearing wall,
   a wear strip mounted to said bearing wall for engagement by said conveyor chain, and
   a connector holding said inner race and said outer race together, such that said inner race is removable from said outer race for removing said wear strip from said curved segment of said track.

2. The conveyor chain assembly of claim 1, wherein said conveyor chain includes a series of links that each include a horizontal wheel for engaging said wear strip.

3. The conveyor chain assembly of claim 1, wherein said connector comprises flanges extending from said inner race and said outer race and bolts holding said flanges together.

4. The conveyor chain assembly of claim 3, wherein said inner race and said outer race include coextensive inner support walls that form said bearing wall, and said flanges are mounted on said coextensive inner support walls.

5. The conveyor chain assembly of claim 1, wherein said wear strip is slot welded to said inner race.

6. The conveyor chain assembly of claim 1, wherein said conveyor chain includes a series of links each including a horizontal wheel for engaging said wear strip in a predetermined path, and said wear strip is slot welded to said inner race on opposite sides of said predetermined path.

7. The conveyor chain assembly of claim 1, wherein said wear strip is formed of harder material than said inner race and said outer race.

8. The conveyor chain assembly of claim 1, wherein said inner race comprises a vertical wall.

9. The conveyor chain assembly of claim 1, wherein said outer race forms an impervious U-shaped bottom wall.

10. A conveyor chain assembly comprising:
    an enclosed track including a curved segment for guiding a conveyor chain in said track,
    said curved segment including an inner race for bearing lateral forces applied by said conveyor chain and an outer race forming with said inner race an internal chain passage for the conveyor chain and an upwardly facing longitudinal slot for passage of a portion of said conveyor chain,
    a wear strip mounted to said inner race for engagement by said conveyor chain, and
    a connector releaseably holding said inner race and said outer race together, such that said inner race is removable from said outer race for removing said wear strip from said curved segment of said track.

11. The conveyor chain assembly of claim 10, wherein said inner race and said outer race include coextensive wall segments, and said wear strip is telescopically mounted in abutment with said coextensive wall segment of said outer race.

12. The conveyor chain assembly of claim 10, wherein said wear strip defines a path for engagement by a bearing wheel of the conveyor chain, and further including connections between said wear strip and said inner race that are positioned on opposite sides of said path.

13. The conveyor chain assembly of claim 12 wherein said connections are weldments.

14. A conveyor chain assembly comprising
    a conveyor chain including chain links each with a horizontal wheel,
    a curved track segment including an inner race and an outer race for guiding said conveyor chain,
    a wear strip mounted to said inner race,
    said wear strip telescopically mounted in said outer race, such that said inner race and said wear strip are movable vertically into assembly with said outer race, and
    said wear strip sized and shaped to be engaged by said horizontal wheel.

15. The conveyor chain assembly of claim 14, wherein said wear strip is welded to said inner race.

16. The conveyor chain assembly of claim 15, wherein said wear strip defines a path for said horizontal wheel, and connections between said wear strip and said inner race on opposite sides of said path.

17. The conveyor chain assembly of claim 14, wherein said outer race defines a dish shaped bottom wall.

18. A conveyor chain assembly comprising
    a conveyor chain including chain links each with a horizontal wheel,
    a curved track segment including an inner race and an outer race for guiding said conveyor chain, said inner race removably mounted to said outer race,
    a wear strip mounted to said inner race and sized and shaped to be engaged by said horizontal wheel.

19. The conveyor chain assembly of claim 18, wherein
    said inner race and said outer race are bolted together, and
    said wear strip telescopically mounted in said inner race and overlapping said outer race, such that said inner race and said wear strip are movable vertically into assembly with said outer race.

20. A conveyor chain including chain links each with a horizontal wheel,
    a curved track segment including an inner race and an outer race for guiding said conveyor chain,
    a wear strip mounted to said inner race,
    said wear strip telescopically mounted in said outer race, such that said inner race and said wear strip are movable vertically into assembly with said outer race, and
    said wear strip sized and shaped to be engaged by said horizontal wheel.

* * * * *